(12) United States Patent
Suzuki (10) Patent No.: US 11,254,001 B2
(45) Date of Patent: Feb. 22, 2022

(54) CONTROLLER, CONTROL SYSTEM AND LADDER PROGRAM

(71) Applicant: FANUC CORPORATION, Yamanashi (JP)

(72) Inventor: Yuuji Suzuki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 351 days.

(21) Appl. No.: 16/420,308

(22) Filed: May 23, 2019

(65) Prior Publication Data

US 2019/0366540 A1    Dec. 5, 2019

(30) Foreign Application Priority Data

Jun. 5, 2018    (JP) .............................. JP2018-108016

(51) Int. Cl.
     *B25J 9/16*           (2006.01)
     *B25J 13/06*          (2006.01)

(52) U.S. Cl.
     CPC .............. *B25J 9/1658* (2013.01); *B25J 13/06* (2013.01)

(58) Field of Classification Search
     CPC ..... B25J 9/1669; B25J 9/1682; G05B 19/056; G05B 19/05; G05B 2219/13052; G05B 2219/13004; G05B 19/052; G05B 19/054; G05B 19/058; G05B 19/0426; G05B 2219/13076; G05B 2219/13088; G05B 2219/13105; G05B 2219/36038
See application file for complete search history.

(56) References Cited

FOREIGN PATENT DOCUMENTS

| JP | H06-250709 A | 9/1994 |
|---|---|---|
| JP | 2003-122410 A | 4/2003 |
| JP | 2004-234042 A | 8/2004 |
| JP | 2014-099063 A | 5/2014 |
| JP | 2017-091458 A | 5/2017 |
| JP | 2017-124454 A | 7/2017 |

OTHER PUBLICATIONS

Office Action issued in JP 2018-108016; mailed by the Japanese Patent Office dated Jun. 30, 2020.

*Primary Examiner* — Adam R Mott
(74) *Attorney, Agent, or Firm* — Studebaker & Brackett PC (57) ABSTRACT

To provide a controller capable of facilitating changing of the order of robot cells, a control system, and a ladder program. A master PLC includes a master input unit that receives a first input signal indicating the order of operation of robot cells, and a second input signal indicating work completion in the robot cells from each of the plurality of robot cells; a master output unit that outputs an output signal for instruction of operation to the robot cell specified on the basis of combination of the first input signals, and the second input signal according to the ladder program; and a storage unit that stores a plurality of the ladder programs corresponding to a plurality of patterns of the order of operation comprising at least some of the plurality of robot cells.

5 Claims, 9 Drawing Sheets

CONTROLLER, CONTROL SYSTEM AND LADDER PROGRAM

This application is based on and claims the benefit of priority from Japanese Patent Application No. 2018-108016, filed on Jun. 5, 2018, the content of which is incorporated herein by reference.

BACKGROUND OF THE INVENTION

Field of the Invention

The present invention relates to a controller for controlling a plurality of robot cells, a control system, and a ladder program.

Related Art

A conventional system is used in which a plurality of robot cells including an industrial robot incorporated therein are arrayed, and a workpiece is sequentially passed among robot cells that perform each step in a production line so that a series of pieces of work is performed (for example, see Patent. Document 1) . In such a system, when a production line is modified in order to correspond to a change in a product specification or the like, a change in the order such as switching, removing, or adding is performed in units of robot cell.

Patent Document 1: Japanese Unexamined Patent Application, Publication No. 2017-124454

SUMMARY OF THE INVENTION

However, when the order of robot cells is changed, since an I/O address between programmable logic controllers (PLCs) as controllers of robot cells needs to be changed, it is necessary to change parameter settings of an input and an output and a ladder program. For such work, familiarity with parameters and a structure of program, and a large burden are required.

An object of the present invention is to provide a controller capable of facilitating changing of the order of robot cells, a control system, and a ladder program.

(1) A controller (for example, a master PLC 11 described later) according to the present invention is a controller that sequentially operates a plurality of robot cells (for example, robot cells R described later) by a ladder program, the controller including: an input unit (for example, a master input unit 111 described later) that receives a first input, signal indicating the order of operation of the robot cells, and a second input signal indicating work completion in the robot cells from each of the plurality of robot cells; an output unit (for example, a master output unit 112 described later) that outputs an output signal for instruction of operation to the robot cell specified on the basis of combination of the first input signals, and the second input signal according to the ladder program; and a storage unit (for example, a storage unit 113 described later) that stores a plurality of the ladder programs corresponding to a plurality of patterns of the order of operation comprising at least some of the plurality of robot cells.

(2) In the controller described in (1), the combination o the first input signals may include the order of the robot cell from which the second input signal is received, and the order of the robot cell located immediately after the order.

(3) In the controller described in (1) or (2), the input unit may receive the first input signal in response to an operation input to an operator's panel (for example, an operator's panel 24 described later) of a robot that operates in the robot cells.

(4) A control system (for example, a control system 1 described later) according to the present invention is a control system including cell controllers (for example, cell PLCs 21 described later) that control each of a plurality of robot cells (for example, robot cells R described later), and a master controller (for example, a master PLC 11 described later) connected to the plurality of cell controllers, in which each of the cell controllers includes: a first cell output, unit (for example, a first cell output unit 211 described later) that outputs a first cell signal indicating the order of operation of the robot cell that, the cell controller controls among the orders of operation of the plurality of robot cells; and a second cell output unit (for example, a second cell output unit 212 described later) that outputs a second cell signal indicating work completion in the robot cell that the cell controller controls, and the master controller includes: a master input unit (for example, a master input unit 111 described later) that receives a first input signal corresponding to the first cell signal and a second input signal corresponding to the second cell signal from each of the plurality of robot cells; a master output unit (for example, a master output unit 112 described later) that outputs an output signal for instruction of operation to the robot cell specified on the basis of combination of the first input signal, and the second input signal according to a ladder program; and a storage unit (for example, a storage unit 113 described later) that stores a plurality of the ladder programs corresponding to a plurality of patterns of the order of operation comprising at least some of the plurality of robot cells.

(5) A ladder program according to the present invention is for causing a controller (for example, a master PLC 11 described later) that sequentially operates a plurality of robot cells (for example, robot cells R described later) to output an output signal for instruction of operation to the robot cell specified on the basis of combination of first input signals, and a second input signal in response to receiving of the first input signal indicating the order of operation of the robot cells, and the second input signal indicating work completion in the robot cells from each of the plurality of robot cells.

With the present invention, changing of the order of robot cells is facilitated.

DETAILED DESCRIPTION OF THE INVENTION

Figure 1:
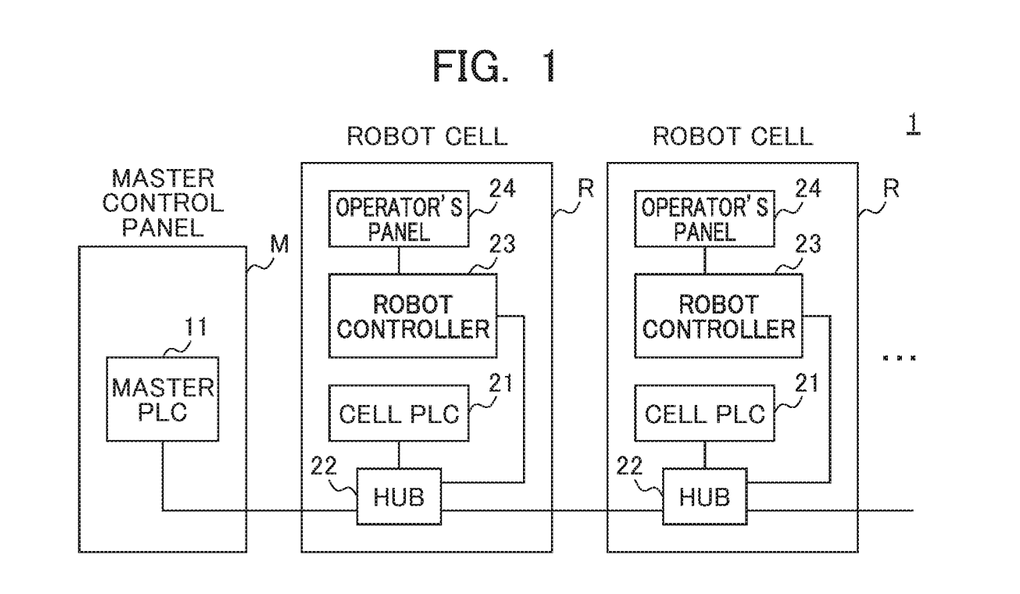
FIG. 1 is a schematic diagram showing a configuration of a control system according to an embodiment.

An example of embodiments of the present invention will be described below. FIG. 1 is a schematic diagram showing a configuration of a control system 1 according to the present embodiment. The control system 1 includes a master control panel H and a plurality of robot cells R. The master control panel M is provided with a master PLC 11 that manages the entire system, each of the robot cells R is provided with a cell PLC 21 (cell controller) that controls own cell, and the plurality of the cell PLC 21 and the master PLC 11 are connected via a hub 22.

Operation of a robot incorporated in each robot cell R is controlled by a robot controller 23 in response to a command from the cell PLC 21. An operator's panel 24 called a pendant for receiving an input from an operator is wirelessly connected to the robot controller 23. Note that the operator's panel 24 may be connected by wire, or may be mounted in a casing of the robot controller 23. That is, in the present embodiment, an input to the operator's panel 24 is a concept including an input to a pendant, an input to a main body of the robot controller 23, and the like.

Figure 2:
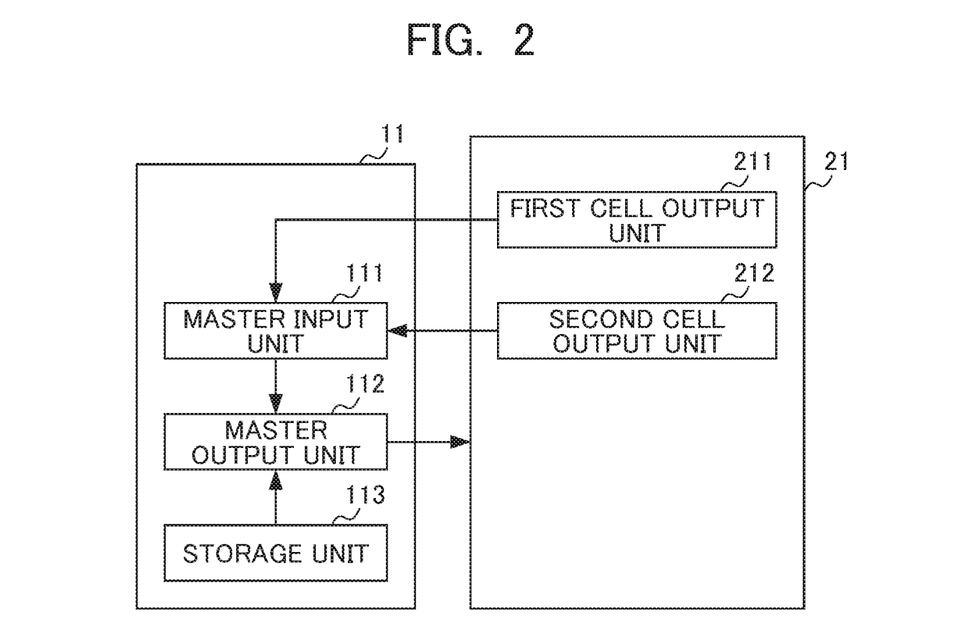
FIG. 2 is a diagram showing a function configuration of a master PLC and a cell PLC according to the embodiment.

FIG. 2 is a diagram showing function configurations of the master PLC 11 and the cell PLC 21 according to the present embodiment. The master PLC 11 includes a master input unit 111, a master output unit 112, and a storage unit 113, and sequentially operates a plurality of robot cells R according to a ladder program. The cell PLC 21 includes a first cell output unit 211 and a second cell output unit 212.

The master input unit 111 receives a first input signal indicating the order of operation (hereinafter, also referred to as "the order of robot cells"), that is, in which position in a production line the robot cells R are arranged, and a second input signal indicating work completion in the robot cells R from each of the plurality of robot cells R. Note that the first input signal is input in response to an operation input to the operator's panel 24 of a robot that operates in the robot cells R.

The master output unit 112 outputs an output signal for instruction of operation to any of the robot cells R that is specified on the basis of combination of the first input signal, and the second input signal according to the ladder program. The combination of the first input signal includes the order of the robot cell from which the second input signal is received, and the order of the robot cell located immediately after the order.

The storage unit 113 stores a plurality of ladder programs, corresponding to a plurality of patterns of the order of operation comprising at least some of the plurality of robot cells R.

The first cell output unit 211 outputs a first cell signal indicating the order of operation of the robot cell R that the own device (cell PLC 21) controls among the orders of operation of the plurality of robot cells R. The first cell signal relays a predetermined signal output from the robot controller 23 in response to the operation input to the operator's panel 24 of the robot that operates in the robot cell R. The first cell signal is input to the master PLC 11 as the first input signal described above.

The second cell output unit 212 outputs the second cell signal indicating work completion in the robot cell R that the own device controls. The second cell signal is input to the master PLC 11 as the second input signal.

Figure 3:
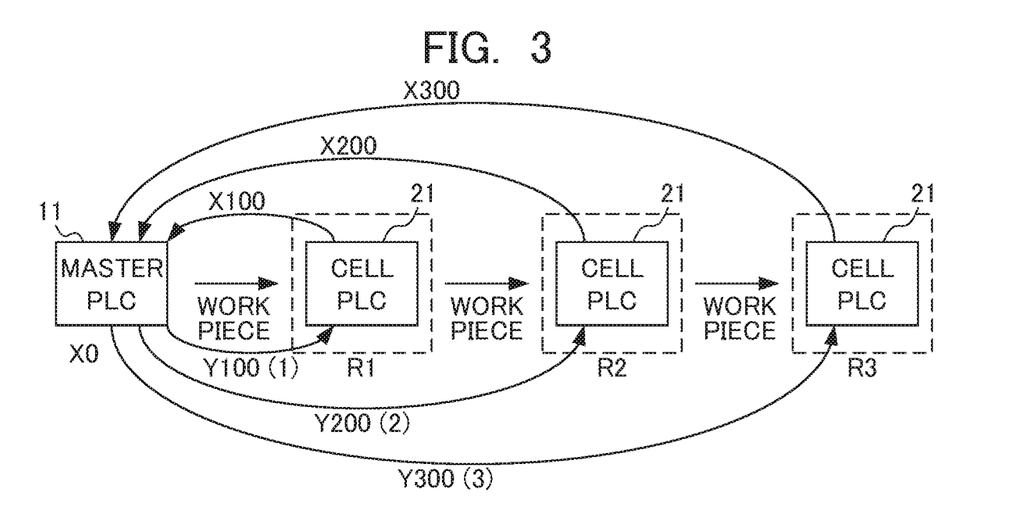
FIG. 3 is a diagram showing a first example of input and output signals in the master PLC according to the embodiment.

FIG. 3 is a diagram showing a first example of input and output signals in the master PLC 11 according to the present embodiment. In this example, three robot cells R are arrayed in the order of R1, R2, and R3. Note that the input signal to the master PLC 11 is represented as X*, and the output signal from the master PLC 11 is represented as Y*.

Each cell PLC 21 passes the input and output signals via the master PLC 11. Specifically, first, when a signal X0 indicating completion of supply preparation of a workpiece is input in the master PLC 11, a signal Y100 for notifying that the workpiece can be taken out is output to the robot cell R1 (1).

Next, when the robot cell R1 that has received the notification by the signal Y100 receives the workpiece and the work is completed, the signal X100 is input from the robot cell R1 to the master PLC 11. Then, in response to this input signal X100, a signal Y200 for notifying that the workpiece can be taken out is output to the robot cell R2 (2).

Similarly, when the robot cell R2 that has received the notification by the signal Y200 receives the workpiece and the work is completed, the signal X200 is input from the robot cell R2 to the master PLC 11. Then, in response to this input signal X200, a signal Y300 for notifying that the workpiece can be taken out is output to the robot cell R3 (3). Then, when the work is completed in the robot cell R3, the signal X300 is input from the robot cell R3 to the master PLC 11.

Figure 4:
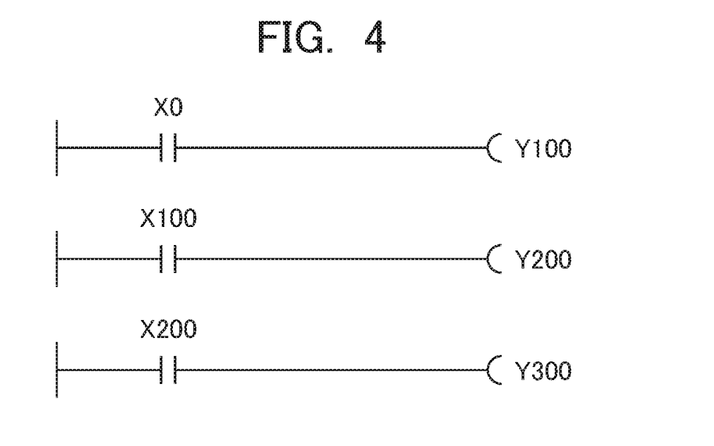
FIG. 4 is a diagram illustrating an example of a ladder program of the master PLC according to the embodiment.

FIG. 4 is a diagram illustrating an example of the ladder program of the master PLC 11 according to the present embodiment. This example is a ladder program used when the robot cells R1, R2, R3 are arrayed as FIG. 3, and this order is fixed.

This ladder program includes description that the signal Y100 is output when the signal X0 is input, the signal Y200 is output when the signal X100 is input, and the signal Y300 is output when the signal X200 is input. As a result, the signals Y100, Y200, Y300 of FIG. 3 are sequentially output in response to the input signals X0, X100, X200, respectively.

Figure 5:
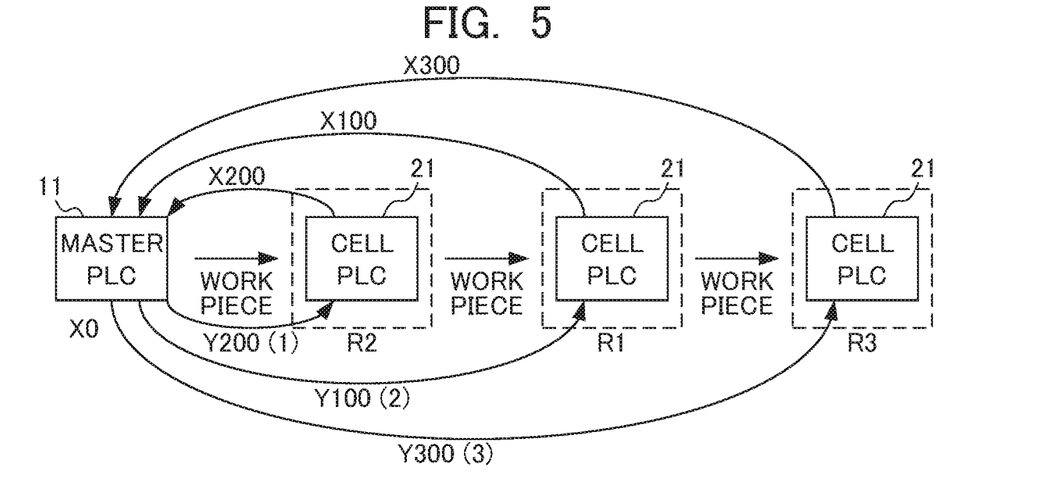
FIG. 5 is a diagram showing a second example of input and output signals in the master PLC according to the embodiment.

FIG. 5 is a diagram showing a second example of input and output signals in the master PLC 11 according to the present embodiment. In the second example, among the three robot cells R1, R2, R3 shown in the first example of FIG. 3, the order of the first and the second are switched.

Thus, the signals X100, X200, X300 input from the robot cells R1, R2, R3 and the signals Y100, Y200, Y300 output to the robot cells R1, R2, R3 are the same as the those in the first example. However, the order of these is different. Specifically, the signal Y200 is output in response to the input signal X0 (1), next, the signal Y100 is output in response to the input signal X200 (2), and lastly, the signal Y300 is output in response to the input signal X100 (3).

Figure 6:
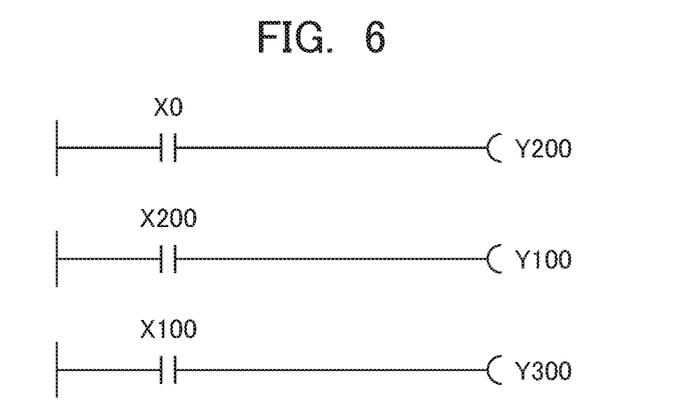
FIG. 6 is a diagram illustrating an example of the ladder program after robot cells are switched according to the embodiment.

FIG. 6 is a diagram illustrating an example of the ladder program after the robot cells R are switched according to the present embodiment. This example is a ladder program used when the robot cells R2, R1, R3 are arrayed as FIG. 5, and this order is fixed.

This ladder program includes description that the signal Y200 is output when the signal X0 is input, the signal Y100 is output when the signal X200 is input, and the signal Y300 is output when the signal X100 is input. As a result, the signals Y200, Y100, Y300 of FIG. 5 are sequentially output in response to the input signals X0, X200, X100, respectively.

In this way, when the order of the robot cells R2, R1, R3 is changed, the description content of the ladder program needs to be changed as shown in FIG. 4 and FIG. 6. Therefore, in the control system 1, the input signal of the master PLC 11 is extended as shown below so that the change of the ladder program is not necessary.

Figure 7:
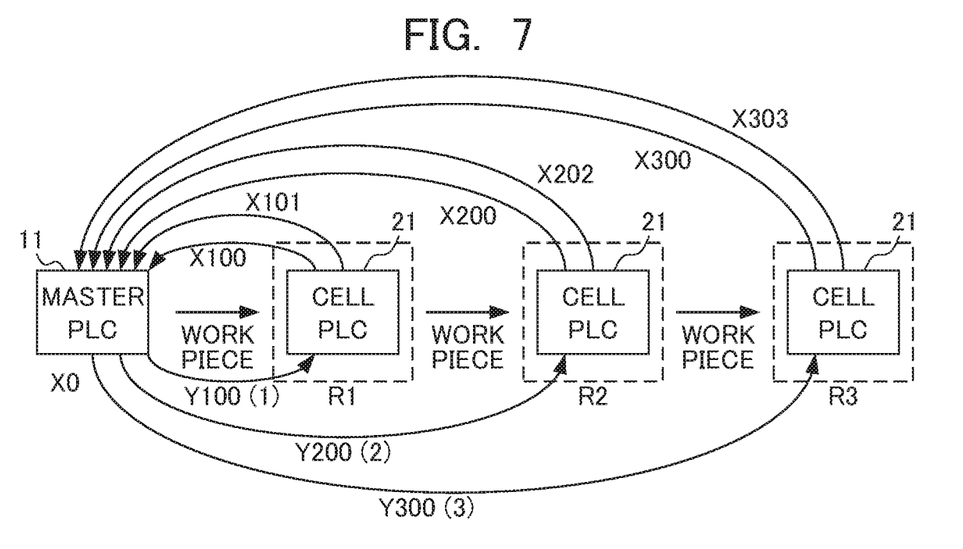
FIG. 7 is a diagram showing an example in which an input signal in the master PLC is extended according to the embodiment.

FIG. 1 is a diagram showing an example in which the input signal in the master PLC 11 is extended according to the present embodiment. In this example, in the configuration shown in FIG. 3, in addition to the second input signal indicating work completion, first input signals X101, X202, X303 are newly added.

Here, the first input signal X101 received from the robot cell R1 indicates that the robot cell R1 is arranged in the first position. For example, this first input signal is X102 when the robot cell R1 is the second from the first position, and this first input signal is X103 when the robot cell R1 is the third from the first position. Similarly, when the robot cell R2 is in the first position, when the robot cell R2 is the second from the first position, and when the robot cell R2 is the third from the first position, the first input signal received from the robot cell R2 is X201, X202, and X203, respectively. When the robot cell R3 is in the first position, when the robot cell R3 is the second from the first position, and when the robot cell R3 is the third from the first position, the first input signal received from the robot cell R3 is X301, X302, and X303, respectively.

Figure 8:
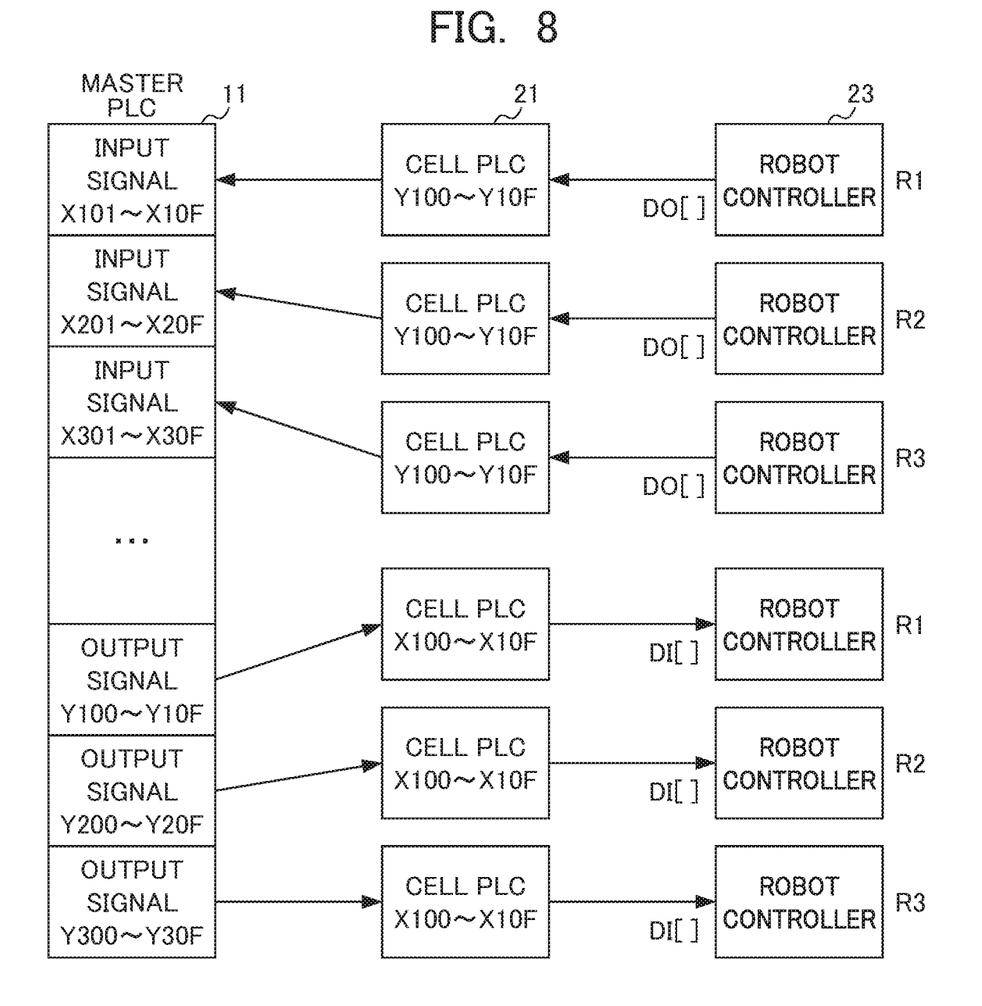
FIG. 8 is a diagram illustrating an example of a relationship of input and output of signals among a robot controller, the cell PLC, and the master PLC according to the embodiment.

FIG. 8 is a diagram illustrating an example of the relationship of inputs and outputs of signals among the robot controller 23, the cell PLC 21, and the master PLC 11 according to the present embodiment. In the plurality of robot cells R1, R2, R3, robot controller 23 of each of them outputs a signal DO[**]. For example, DO[10], DO[11], and DO[12] are robot signals indicating that the order of operation of themselves are the first, the second, and the third, respectively. Such robot signals are output in response to an input to the operator's panel 24 such as an operation input to a pendant, switching operation of a DIP switch provided in the robot controller 23, or the like.

These robot signals are associated with an address assigned to each robot cell R (for example, X101 to X10F with respect to the robot cell R1) as the input signal of the master PLC 11 via a through signal (for example, Y100 to Y10F) of the cell PLC 21. When the output signal based on the input signal is determined according to the ladder program, this output signal is associated with the input signal DI[**] of the robot controller 23 via input and output signals of the cell PLC 21.

Note that these input and output signals are represented by turning ON of a predetermined address. Association of addresses among devices is parameter set in advance so that signals are transmitted among the robot controller 23, the cell PLC 21, and the master PLC 11.

Figure 9:
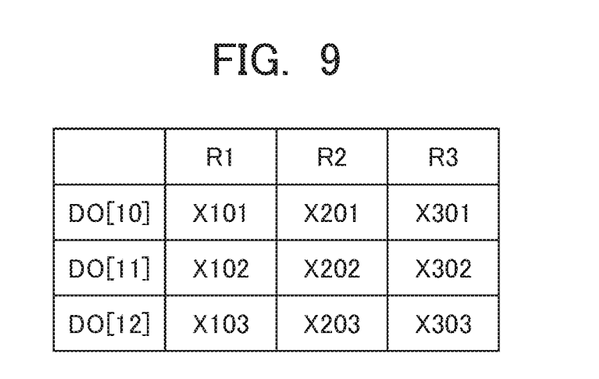
FIG. 9 is a diagram illustrating an example of parameter settings in which a robot signal and an input signal of the master PLC are associated with each other according to the embodiment.

FIG. 9 is a diagram illustrating an example of parameter settings in which the robot signal and the input signal of the master PLC 11 are associated with each other according to the present embodiment. In this example, the robot signals DO[10], DO[11], and DO[12] output by the robot cells R1, R2, R3 indicate that the orders of operation are the first, the second, and the third from the first position, respectively.

For example, the robot signals DO[10], DO[11], and DO[12] output from the robot cell R1 are associated with the input signals X101, X102, and X103 of the master PLC 11, respectively. Similarly, the robot signals DO[10], DO[11], and DO[12] output from the robot cell R2 are associated with the input signals X201, X202, and X203 of the master PLC 11, respectively.

In the ladder program stored in the storage unit 113 of the master PLC 11, these input signals indicating the order of operation of the robot cells R are added to the conditions. As a result, irrespective of the array of the robot cells R, the master output unit 112 can unambiguously determine an output signal.

FIGS. 10A to 10F are diagrams illustrating examples of the improved ladder program of the master PLC 11 according to the present embodiment. Here, as FIG. 7, although a case where three robot cells R1, R2, R3 are arrayed is shown, the order is not particularly limited.

Figure 10A:
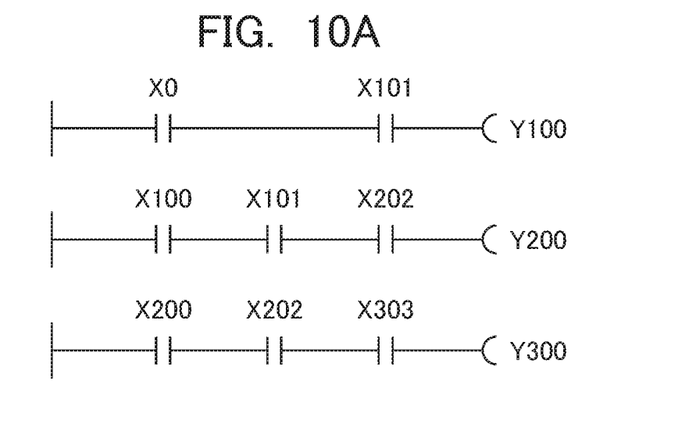
FIG. 10A is a first diagram illustrating an example of the improved ladder program of the master PLC according to the embodiment.
Figure 10B:
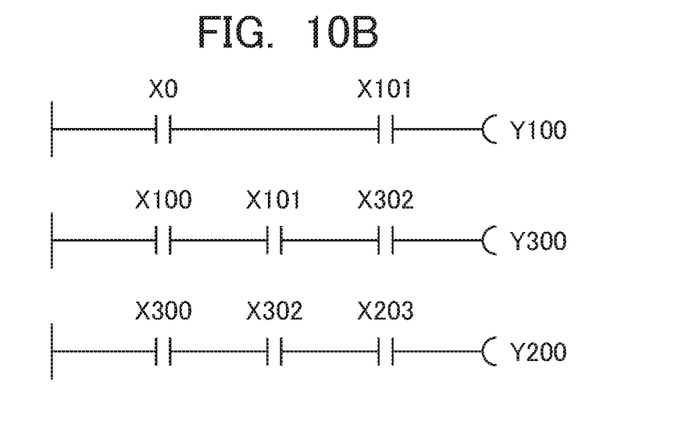
FIG. 10B is a second diagram illustrating an example of the improved ladder program of the master PLC according to the embodiment.
Figure 10C:
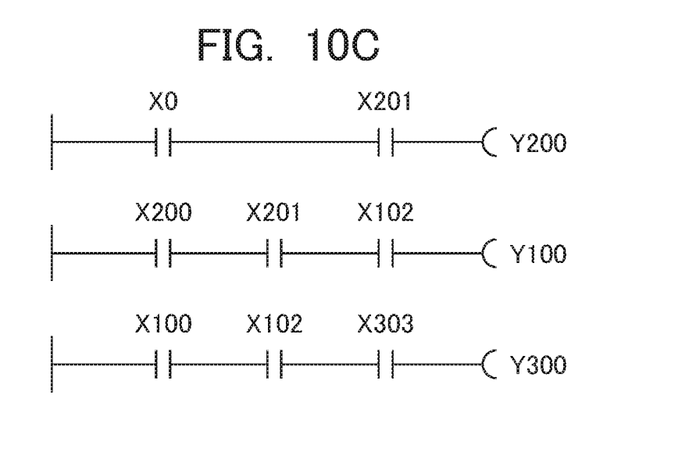
FIG. 10C is a third diagram illustrating an example of the improved ladder program of the master PLC according to the embodiment.
Figure 10D:
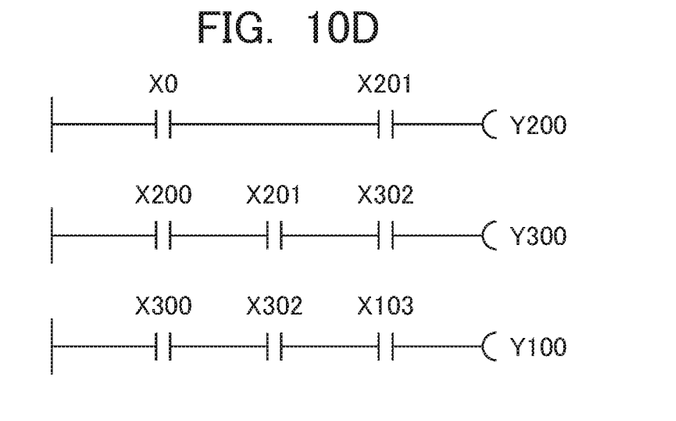
FIG. 10D is a fourth diagram illustrating an example of the improved ladder program of the master PLC according to the embodiment.
Figure 10E:
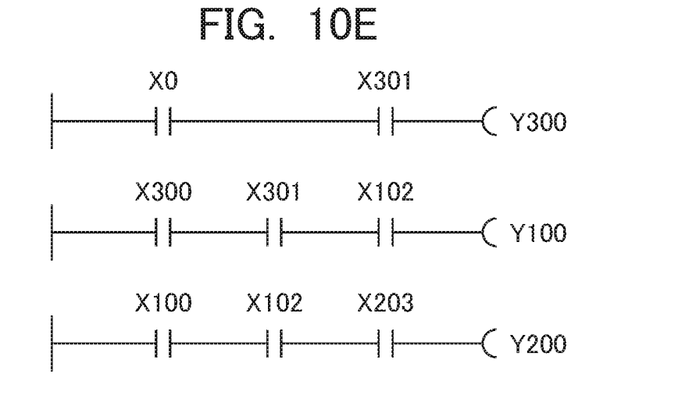
FIG. 10E is a fifth diagram illustrating an example of the improved ladder program of the master PLC according to the embodiment.
Figure 10F:
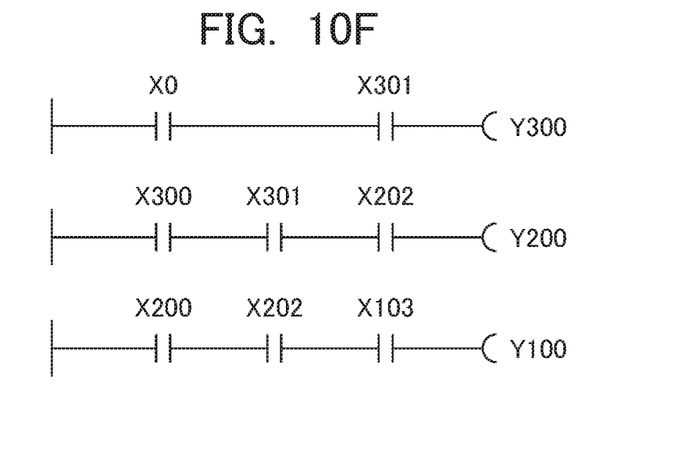
FIG. 10F is a sixth diagram illustrating an example of the improved ladder program of the master PLC according to the embodiment.

FIG. 10A shows the ladder program referred to when the order of operation of the robot cells R is R1, R2, R3, FIG. 10B shows the ladder program referred to when the order of operation of the robot cells R is R1, R3, R2, FIG. 10C shows the ladder program referred to when the order of operation of the robot cells R is R2, R1, R3, FIG. 10D shows the ladder program referred to when the order of operation of the robot cells R is R2, R3, R1, FIG. 10E shows the ladder program referred to when the order of the robot cells R is R3, R1, R2, and FIG. 10F shows the ladder program referred to when the order of operation of the robot cells R is R3, R2, R1.

Conventionally, rewriting of the ladder program with respect to the input signal X0 occurs according to the order of operation of the robot cells R as shown in FIG. 4 and FIG. 6. However, in the present embodiment, a plurality of patterns to which the conditions of X101, X201, or X301 are added are described so that the output signal Y100, Y200, or Y300 is selectively determined from the plurality of ladders. For example, in the upper stage of FIG. 10A, it is described that, when the signal X0 is input, in a case where the order of operation of the robot cell R1 is the first, that is, in a case where the signal X101 is input, the signal Y100 is output.

A plurality of patterns are described with respect to the input signal X100, the patterns including conditions to which the order of the robot cell R1 of which work is completed, and the order of the robot cell R2 or R3 of which work is to be performed next are added. As a result, the output signal Y200 or Y300 is selectively determined from a plurality of ladders. For example, it is described that, in the middle stage of FIG. 10A, when the signal X100 is input, in a case where the order of operation of the robot cell R1 of which work is completed is the first, and the second is the robot cell R2, that is, in a case where the signal X101 and the signal X202 are input, the signal Y200 is output. It is described that, in the lower stage of FIG. 10C, when the signal X100 is input, in a case where the order of operation of the robot cell R1 of which work is completed is the second, and the third is the robot cell R3, that is, a case where the signal X102 and the signal X303 are input, the signal Y300 is output.

Figure 11A:
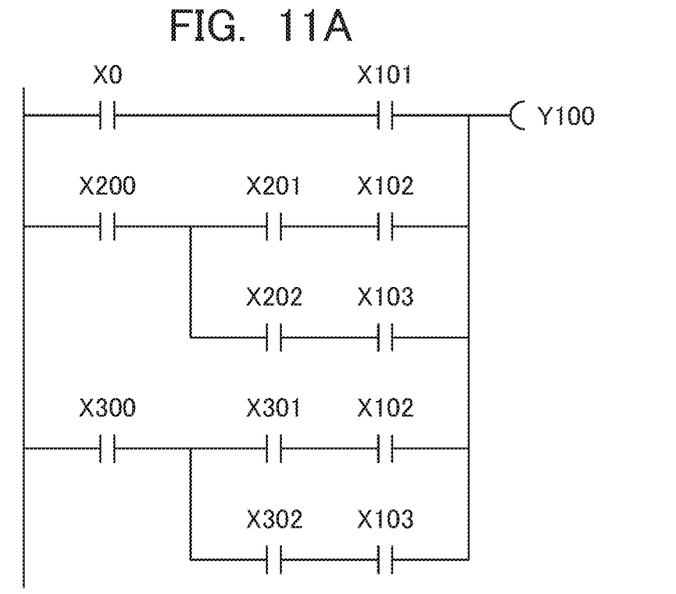
FIG. 11A is a first diagram illustrating an example of a set of the ladder programs stored in the master PLC according to the embodiment.
Figure 11B:
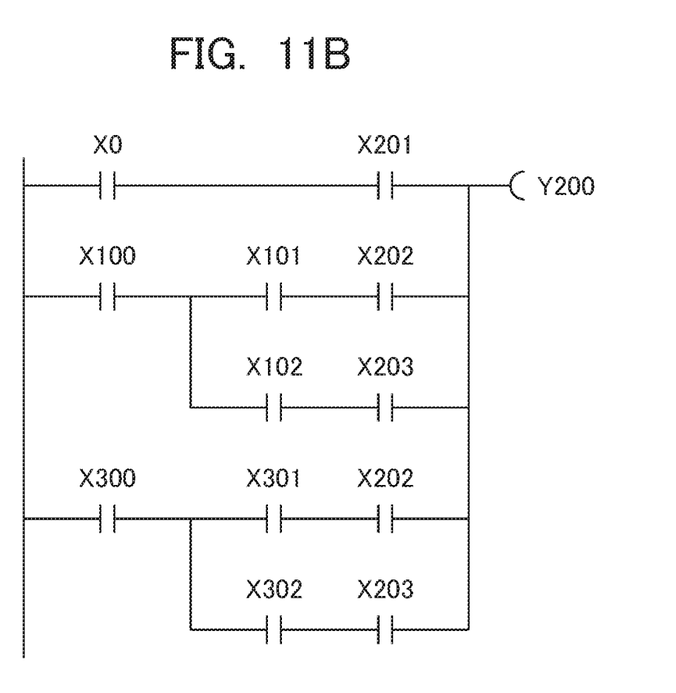
FIG. 11B is a second diagram illustrating an example of a set of the ladder programs stored in the master PLC according to the embodiment.
Figure 11C:
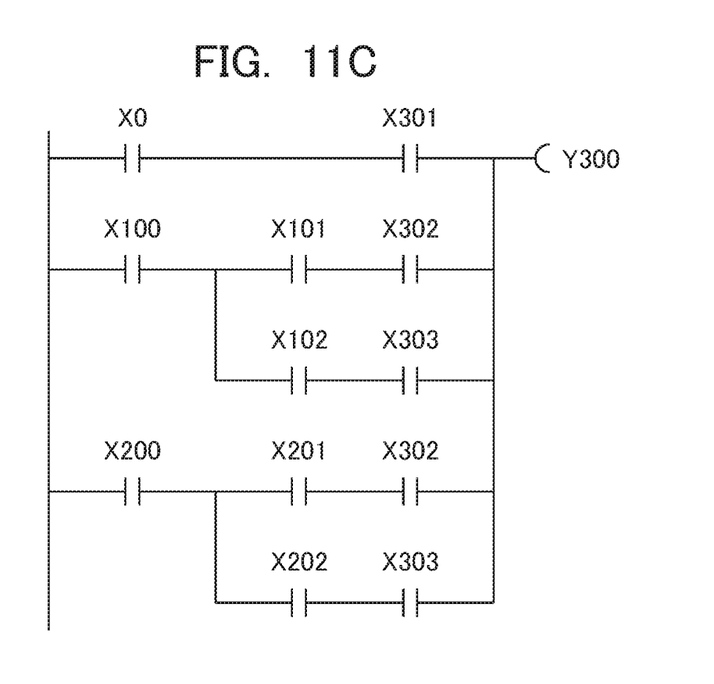
FIG. 11C is a third diagram illustrating an example of a set of the ladder programs stored in the master PLC according to the embodiment.

FIGS. 11A to 11C are diagrams illustrating examples of a set of the ladder programs stored in the master PLC 11 according to the present embodiment. Three ladder programs integrated for each of three types of output signals Y100, Y200, Y300 can be created by excluding overlapping from six patterns of ladder programs (FIGS. 10A to F) shown for each order of operation of the robot cells R1, R2, R3, and organizing the remaining ladder programs. FIG. 11A shows the ladder program with which the output signal is Y100, FIG. 11B shows the ladder program with which the output signal is Y200, and FIG. 11C shows the ladder program with which the output, signal is Y300.

For example, in FIG. 11A, it is described that the signal Y100 is output on the any of five types of conditions, that is, a case where the signal X101 has been input when the signal X0 is input, a case where the signals X201 and X102 or the signals X202 and X103 have been input when the signal X200 is input, or a case where the signals X301 and X102 or the signals X302 and X103 have been input when the signal X300 is input.

In addition, for example, when the signal X100 is input, with reference to FIGS. 11B and 11C, four conditions are covered, that is: whether the robot cell R1 of which work is completed is the first (X101) or the second (X102); if it is the first (X101), whether the second is the robot cell R2 (X202) or the robot cell R3 (X302); and if it is the second (X102), whether the third is the robot cell R2 (X203) or the robot cell R3 (X303). Accordingly, the output signal is unambiguously determined by the input signal.

By setting a set of these ladder programs in advance, even when the order of operation of the plurality of robot cells R is changed, the output signal is unambiguously determined. Note that, when any of the robot cells R is removed from the production line, the input signal from the removed robot cell R is eliminated, so that some of the ladder programs are not referred to, and the output signal with respect to the removed robot cell R does not occur. For example, when the robot cell R2 is removed from the production line, the signals X200, X201, X202, X203, X103, X303 are not turned on any more. Accordingly, only the ladder program including any of the signals X100, X300, X101, X102, X301, X302 is referred to, and the signal Y100 or Y300 is output.

By preparing the ladder program including the robot cell R that has probability of being added, even when any change of switching, removing, or adding of the robot cell R occurs, the master PLC 11 can unambiguously determine the output signal. For example, when the robot cell R2 is added to the production line in which only the robot cells R1 and R3 are arrayed, if the ladder programs of FIGS. 11A to 11C are stored in advance, the output signal is correctly and unambiguously determined as described above, irrespective of the order of operation of the robot cells R1 to R3.

According to the present embodiment, in the master PLC 11, the control system 1 receives the first input signal indicating the order of operation of the robot cell R, and the second input signal indicating work completion in the robot cell R, and outputs the output signal for instruction of operation to the robot cell R specified on the basis of combination of the first input signals, and the second input signal according to the ladder program. The master PLC 11 can store a plurality of the ladder programs corresponding to a plurality of patterns of the order of operation comprising at least some of the plurality of robot cells R, to correctly determine the output signal even when changing of the order of robot cells R occurs. Accordingly, changing of the order of robot cells R is facilitated.

The combination of the first input signals described in the ladder program includes the order of the robot cell R from which the second input signal is received, and the order of the robot cell R located immediately after the order. As a result, the master PLC 11 can easily and unambiguously determine the output signal on the basis of the second input signal, and combination of the first input signals.

The master PLC 11 receives the first input signal indicating the order of operation of the robot cell R in response to an operation input to the operator's panel 24 of the robot cell R. As a result, the control system 1 can easily notify the master PLC 11 of the change result in changing of the order of robot cells R.

The embodiment of the present invention has been described above. However, the present invention is not limited to the embodiment described above. The effects described in the present embodiment are merely listing of the most preferable effects generated from the present invention. The effects by the present invention are not limited to those described in the present embodiment.

A control method by the control system 1 is realized by software. When the control method is realized by software, a program composing the software is installed in a computer. These programs may be recorded in a removable medium to be distributed to a user, and may be downloaded to a user's computer via a network to be distributed.

EXPLANATION OF REFERENCE NUMERALS

M Master control panel
R Robot cell
1 Control system
22 Hub
23 Robot controller
24 Operator's panel
111 Master input unit
112 Master output unit
113 Storage unit
211 First cell output unit
212 Second cell output unit

What is claimed is:

1. A controller that sequentially operates a plurality of robot cells by a ladder program, the controller comprising:
an input unit that receives a first input signal and a second input signal from each of the plurality of robot cells, the first input signals indicating an order of operation of the corresponding robot cells and the second input signals indicating work completion in the corresponding robot cells;
an output unit that outputs an output signal for instruction of operation to one of the plurality of robot cells according to the ladder program, the one of the plurality of robot cells being specified on the basis of the second input signal from another one of the plurality of robot cells and a combination of the first input signals, and the output signal causing the specified robot cell to operate; and a storage unit that stores a plurality of ladder programs corresponding to a plurality of patterns of the order of operation of at least some of the plurality of robot cells, the ladder program being one of the plurality of ladder programs.

2. The controller according to claim 1, wherein the combination of the first input signals comprises the order of operation of the robot cell from which the second input signal is received, and the order of operation of the robot cell located immediately after the robot cell from which the second input signal is received.

3. The controller according to claim 1, wherein the input unit receives the first input signal in response to an operation input to an operator's panel of a robot that operates in the robot cells.

4. A control system comprising cell controllers that control each of a plurality of robot cells, and a master controller connected to the plurality of cell controllers, wherein each of the cell controllers comprises:
a first cell output unit that outputs a first cell signal indicating an order of operation of the robot cell that the cell controller controls; and
a second cell output unit that outputs a second cell signal indicating work completion in the robot cell that the cell controller controls, and the master controller comprises:
a master input unit that receives a first input signal corresponding to the first cell signal, and a second input signal corresponding to the second cell signal from each of the plurality of robot cells;
a master output unit that outputs an output signal for instruction of operation to one of the plurality of robot cells according to a ladder program, the one of the plurality of robot cells being specified on the basis of the second input signal from another one of the plurality of robot cells and a combination of the first input signals, and the output signal causing the specified robot cell to operate; and
a storage unit that stores a plurality of ladder programs corresponding to a plurality of patterns of the order of operation of at least some of the plurality of robot cells, the ladder program being one of the plurality of ladder programs.

5. A non-transitory computer readable medium configured to store a ladder program that when executed causes a processor to:

specify one of a plurality of robot cells on the basis of a second input signal from another one of the plurality of robot cells and a combination of first input signals, each first input signal being received from a respective one of the plurality of robot cells; and output an output signal for instruction of operation to the specified robot cell in response to receiving the first input signal and the second input signal from each of the plurality of robot cells, the first input signals indicating the order of operation of the corresponding robot cells and the second input signals indicating work completion in the corresponding robot cells, wherein the output signal causes the specified robot cell to operate.

* * * * *